United States Patent [19]

Yamaguchi et al.

[11] Patent Number: 4,545,316
[45] Date of Patent: Oct. 8, 1985

[54] MARINE FENDERS

[75] Inventors: Ikutoshi Yamaguchi, Chigasaki; Shinichi Kajigaya, Yokohama, both of Japan

[73] Assignee: Bridgestone Tire Company Limited, Tokyo, Japan

[21] Appl. No.: 517,192

[22] Filed: Jul. 26, 1983

[30] Foreign Application Priority Data

Aug. 12, 1982 [JP]  Japan .................. 57-139192

[51] Int. Cl.4 ............................................ B63B 59/02
[52] U.S. Cl. .................................................. 114/219
[58] Field of Search ............... 114/219, 220; 293/136; 267/140; 405/212, 215

[56] References Cited

U.S. PATENT DOCUMENTS 3,533,242 10/1970 Narabu .................. 114/219
3,680,851 8/1972 Takada .................. 267/140

FOREIGN PATENT DOCUMENTS 2444753 8/1980 France .................. 405/215

Primary Examiner—Jesus D. Sotelo
Attorney, Agent, or Firm—Sughrue, Mion, Zinn, Macpeak, and Seas

[57] ABSTRACT

A marine fender provided with a shock receiving plate is disclosed. In the marine fender, at least one rod member is embedded in a shock receiving portion along its side edge and connected to the shock receiving plate by means of connecting members.

20 Claims, 8 Drawing Figures

FIG_1
PRIOR ART
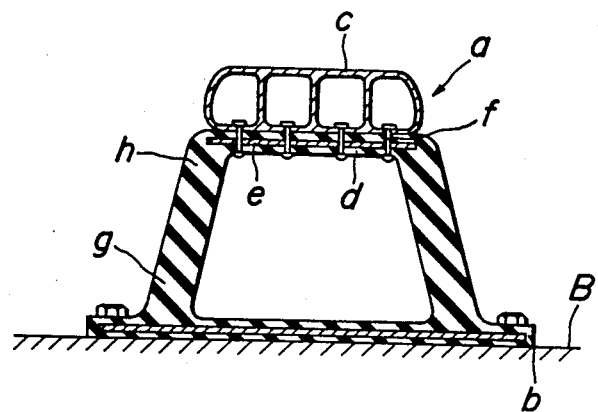
FIG_2
PRIOR ART
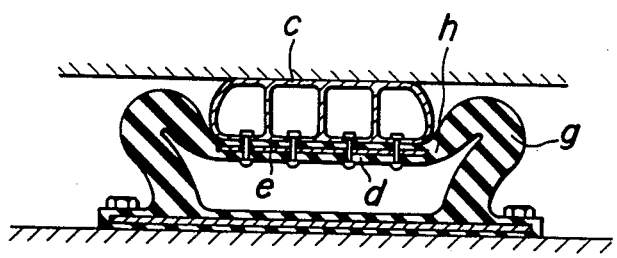

FIG_5
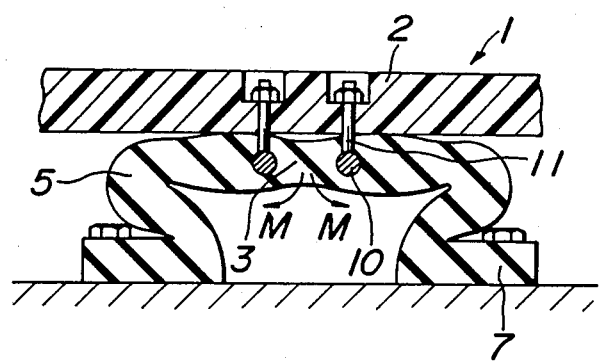
FIG_6
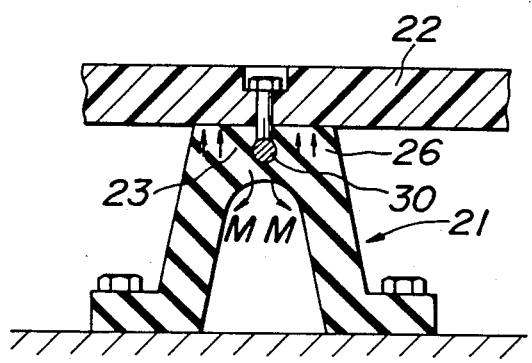

MARINE FENDERS

This invention relates to a marine fender provided with a shock receiving plate, which is attached to a quay wall or the like and used as a buffer structure in the berthing or mooring of vessels.

This type of the marine fender provided with the shock receiving plate has hitherto been known to have a structure as shown in FIG. 1 (Japanese Patent Application Publication No. 49-6,352).

That is, in such a marine fender provided with the shock receiving plate (hereinafter referred to as a marine fender assembly); a is a hollow structural body comprising a base portion b secured to a quay wall B or the like and a shock receiving portion d provided at its outer surface with a shock receiving plate c. In this example, the shock receiving plate c is connected to the shock receiving portion d through a plate body e such as iron plate or the like embedded in the shock receiving portion d over its entire area by means of connecting members f.

However, when the marine fender assembly a having the above mentioned structure is deformed by applying a berthing load thereto as shown in FIG. 2, the shock receiving portion d does not substantially deform owing to the presence of the plate body e, so that the deformation concentrated into both side edges of the shock receiving portion d, i.e. each top part h of a supporting portion g. Therefore, the top portion h is apt to deteriorate by repetitive use, which causes a problem in durability.

It is, therefore, an object of the invention to eliminate the aforementioned drawback of the prior art and to improve the durability of the marine fender.

According to the invention, a marine fender comprises a shock receiving portion provided at its outer surface with a shock receiving plate, a supporting portion extending from each side edge of said shock receiving portion toward a quay wall or the like, and a flanged base portion protruding sidewards from said supporting portion, these portions being formed of a rubbery elastic material. At least one rod member is embedded in the shock receiving portion along its side edge and connected to said shock receiving plate by means of connecting members.

In the marine fender according to the invention, the rod member is embedded in the shock receiving portion so as to fix the shock receiving plate, so that when the marine fender is subjected to a berthing load, the shock receiving portion is deformed together with the deformation of the supporting portion. Thus, any stress concentration does not occur in the top part of the supporting portion and the durability is considerably improved. Furthermore, the deformation of the shock receiving portion as well as the supporting portion withstands to the berthing load, so that the buffering performance as a marine fender is excellent.

The invention will now be described in detail with reference to the accompanying drawings, wherein:

FIG. 1 is an axial section of the conventional marine fender provided with the shock receiving plate as mentioned above;

FIG. 2 is a diagrammatic sectional view illustrating deformation mode of the marine fender shown in FIG. 1;

FIG. 5 is a diagrammatic sectional view illustrating deformation mode of FIG. 4.

FIG. 6 is an axial sectional view of another embodiment of the marine fender according to the invention;

Figure 3:
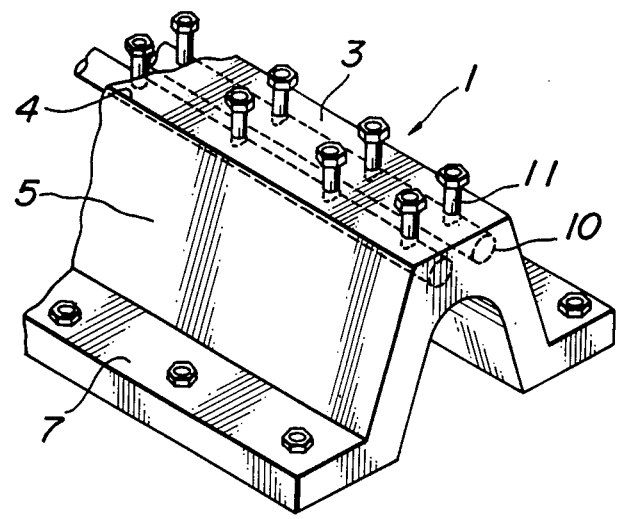
FIG. 3 is a partial perspective view of an embodiment of the marine fender provided with shock receiving plate according to the invention.

First of all, the invention will be explained with reference to an embodiment shown in FIGS. 3 to 5.

A marine fender 1 comprises a body of a hat-shaped section made of an elastic material such as rubber or the like and a shock receiving plate 2 secured thereto. Further, the fender body comprises a shock receiving portion 3, a supporting portion 5 extending divergently from each side edge of the shock receiving portion 3 toward a quay wall B, a flanged base portion 7 protruding sidewards from the supporting portion 5, a pair of rod member 10 longitudinally embedded in the shock receiving portion 3 along both side edges 4 thereof, and a plurality of connecting members 11 such as bolts or the like studded on each of the rod members 10 at a proper pitch and protruding upward from the outer surface of the shock receiving portion 3. Moreover, the rod member 10 must be durable in its attachment to the connecting member 11, so that it is made from a metal such as steel and the like or other materials having high strength and rigidity and may have any sectional shape selected from circle, square, L-shape, ⊐-shape, hollow shape and the like.

Figure 4:
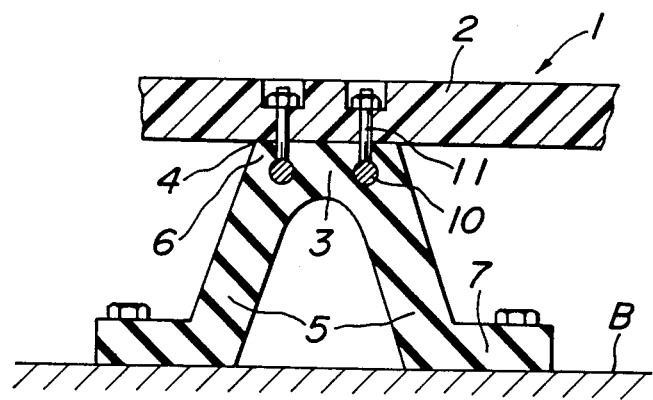
FIG. 4 is an axial sectional view of the marine fender of FIG. 3.

The shock receiving plate 2 is secured to the shock receiving portion 3 through the connecting members 11 (see FIGS. 3 and 4).

When a berthing load is applied to the shock receiving plate 2 of the marine fender 1 having the above mentioned structure, each of the supporting portions 5 is deformed outwardly in two fold parts, and at the same time a downward bending moment M acts on the shock receiving portion 3 as shown in FIG. 5. Since the shock receiving portion is not restrained unlike the conventional marine fender a, it deforms freely and results in a mid-down shape. Therefore, any stress concentration does not occur in the top part 6 of the supporting portion 5; rather, the stress is evenly distributed in the shock receiving portion 3. In other words, the berthing load can be mitigated by the supporting portion 5 and the shock receiving portion 3 as a whole. Furthermore, the bearing of load by the top part 6 is reduced, so that the deterioration due to fatigue is less and the durability is improved considerably.

In the production of the marine fender body, the mutual distance between the rod members 10 can be maintained by connecting the rod members 10 to each other through a plurality of fine wire bodies. In this case, it is necessary to use the wire body capable of accepting the deformation of the shock receiving portion 3.

Further, ridges such as bamboo joints and the like may be formed on the rod member 10 to improve the integral structure with the elastic material such as rubber or the like.

The rod member 10, may be obtained by dividing a single continuous rod into plural parts in addition to using a continuous rod.

In another embodiment of the invention as shown in FIG. 6, a rod member 30 is embedded in a shock receiving portion 23 of a marine fender 21 at its widthwise center, so that when being subjected to a berthing load, a bending moment M acts on the shock receiving portion 23 to enlarge the lower part of the shock receiving portion 23 at its center and at the same time a top part 26 is pushed to the shock receiving plate 22 to suffer compression deformation. Therefore, the marine fender 21 produces no forced stress concentration, improves the durability and has an excellent buffering performance.

Figure 7:
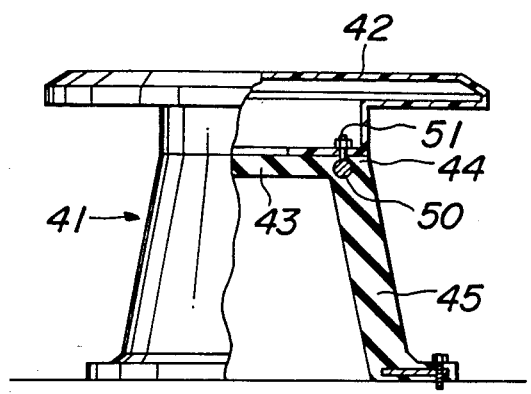
FIG. 7 is an axial elevational view, partly shown in section, of a further embodiment of the marine fender according to the invention.
Figure 8:
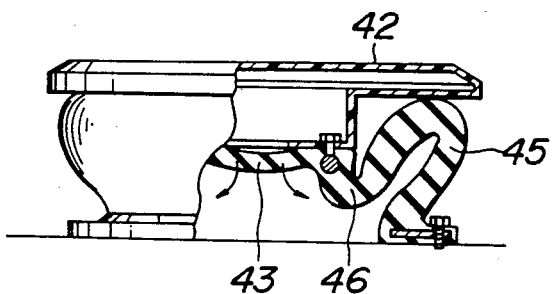
FIG. 8 is a diagrammatic view illustrating deformation mode of FIG. 7.

A further embodiment of the invention is shown in FIG. 7. A marine fender 41 in accordance with this embodiment is a conical hollow cylindrical. An annular ring 50 is embedded as a rod member in a shock receiving portion 43 of the fender body along its side edge 44, and a shock receiving plate 42 is secured to the shock receiving portion 43 through connecting members 51 protruding from the ring 50. When the marine fender 41 is subjected to a berthing load, a supporting portion 45 is bent into two fold parts and at the same time the central part of the shock receiving portion 43 is deformed in a downward falling form as shown in FIG. 8. As a result, stress is dispersed over the entirety of the marine fender 41 to develop excellent buffering performance.

Moreover, a pair of two marine fenders used in each of the above embodiments may be used as a set of two-step type marine fender by uniting the opposed shock receiving plates with each other, securing one of the base portions to the quay wall and attaching a new shock receiving plate to the other base portion.

According to the invention, at least one rod member is embedded in the shock receiving portion of the marine fender instead of the usually used plate body, so that the deformation of the shock receiving portion is not restrained due to the bending moment produced in the shock receiving portion. Also the stress concentration does not occur in the top part of the supporting member. In the marine fender according to the invention, therefore, a berthing load can be buffered by the entire marine fender to develop excellent buffering performance and at the same time the durability can be improved considerably.

What is claimed is:

1. A marine fender comprising; a shock receiving portion provided at its outer surface with a shock receiving plate, a supporting portion extending from said shock receiving portion toward a quay wall, a flanged base portion protruding sidewards from said supporting portion, said shock receiving, supporting and flanged base portions being formed of a rubbery elastic material, at least one rod member embedded in the center of said shock receiving portion parallel to a side edge thereof and connecting members coupling said rod member to said shock receiving plate.

2. The marine fender of claim 1 wherein a pair of rod members are embedded longitudinally in said shock receiving portion and extending parallel to each other and side edges of said shock receiving portion.

3. The marine fender of claim 2 wherein said supporting portion comprises a pair of legs extending from said shock receiving portion and diverging from each other and, said flanged base portion extending parallel to said quay wall.

4. The marine fender of claim 1 wherein said connecting members extend upwardly from said rod member and said shock receiving plate comprising a series of recesses receiving said connecting members.

5. The marine fender of claim 1 wherein said shock receiving portion, said supporting portion and said flanged base portion are formed integrally from a rubbery elastic material.

6. The marine fender of claim 1 wherein said supporting portion comprises a truncated conical member and said shock receiving portion comprises a circular element.

7. The marine fender of claim 6 wherein said rod is an annular ring embedded in said shock receiving portion concentric with an outer edge of said shock receiving portion.

8. The marine fender of claim 6 wherein said shock receiving portion, said supporting portion and said flanged base portion are formed integrally from a rubbery elastic material.

9. The marine fender of claim 6 wherein said shock receiving plate comprises a hollow body having portions protruding outward from said shock receiving portion.

10. The marine fender of claim 9 wherein said shock receiving plate comprises a series of thru-holes receiving said connecting members.

11. A marine fender comprising; a shock receiving portion provided at its outer surface with a shock receiving plate, said shock receiving portion comprising a circular element, a supporting portion extending from said shock receiving portion toward a quay wall, said supporting portion comprising a truncated conical member, a flanged base portion protruding sidewards from said supporting portion, said shock receiving, supporting and flanged base portions being formed of a rubbery elastic material, at least one rod member embedded in said shock receiving portion parallel to a side edge thereof and connecting members coupling said rod member to said shock receiving plate.

12. The marine fender of claim 11 wherein a pair of rod members are embedded longitudinally in said shock receiving portion and extending parallel to each other and side edges of said shock receiving portion.

13. The marine fender of claim 12 wherein said supporting portion comprises a pair of legs extending from said shock receiving portion and diverging from each other and, said flanged base portion extending parallel to said quay wall.

14. The marine fender of claim 11 wherein said connecting members extend upwardly from said rod member and said shock receiving plate comprising a series of recesses receiving said connecting members.

15. The marine fender of claim 11 wherein said shock receiving portion, said supporting portion and said flanged base portion are formed integrally from a rubbery elastic material.

16. The marine fender of claim 11 wherein said rod member is embedded at the center of said shock receiving portion.

17. The marine fender of claim 11 wherein said rod is an annular ring embedded in said shock receiving portion concentric with an outer edge of said shock receiving portion.

18. The marine fender of claim 11 wherein said shock receiving portion, said supporting portion and said flanged base portion are formed integrally from a rubbery elastic material.

19. The marine fender of claim 11 wherein said shock receiving plate comprises a hollow body having portions protruding outward from said shock receiving portion.

20. The marine fender of claim 19 wherein said shock receiving plate comprises a series of thru-holes receiving said connecting members.

* * * * *